United States Patent
Chung et al.

(10) Patent No.: US 7,602,623 B2
(45) Date of Patent: *Oct. 13, 2009

(54) APPARATUS, SYSTEM, AND METHOD FOR A LOW COST SELF-HEALING POWER SUPPLY

(75) Inventors: Chu T. Chung, Cary, NC (US); Cecil C. Dishman, Raleigh, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/966,450

(22) Filed: Dec. 28, 2007

(65) Prior Publication Data

US 2009/0168472 A1    Jul. 2, 2009

(51) Int. Cl.
*H02H 7/122* (2006.01)
*H02H 7/00* (2006.01)

(52) U.S. Cl. ............... 363/56.01; 361/18
(58) Field of Classification Search ........... 363/50, 363/55, 56.01–56.05, 56.09–56.11; 361/18, 361/86, 88, 92, 103, 104
See application file for complete search history.

(56) References Cited

U.S. PATENT DOCUMENTS

| | | | |
|---|---|---|---|
| 3,614,327 A | 10/1971 | Low et al. | 179/15 |
| 4,532,443 A | 7/1985 | Glennon | 307/575 |
| 4,706,177 A | 11/1987 | Josephson | 363/24 |
| 4,717,996 A | 1/1988 | Bourke et al. | 363/56 |
| 5,160,851 A | 11/1992 | McAndrews | 307/66 |
| 5,381,330 A | 1/1995 | Gründl et al. | 363/132 |
| 5,491,622 A * | 2/1996 | Carosa | 363/56.02 |
| 5,821,783 A | 10/1998 | Torimaru et al. | 327/108 |
| 5,859,772 A * | 1/1999 | Hilpert | 363/56.03 |
| 6,875,970 B2 * | 4/2005 | Kim | 219/746 |
| 2004/0095021 A1 | 5/2004 | Fogleman et al. | 307/52 |

* cited by examiner

*Primary Examiner*—Matthew V Nguyen
(74) *Attorney, Agent, or Firm*—Kunzler & McKenzie

(57) ABSTRACT

An apparatus, system, and method are disclosed for a low cost self-healing power supply. The invention includes a power supply that regulates a direct current ("DC") regulated bus to maintain a regulated bus voltage under varying load conditions. The power supply includes at least one pulse-width modulated stage, wherein each pulse-width modulated stage includes at least two switches connected in parallel. Each switch includes a fuse connected in series with the switch that disconnects the switch in response to an over current condition sufficient to open the fuse.

The power supply also includes a pulse-width modulator for each stage of the power supply that regulates a bus voltage controlled by the stage by sensing the controlled bus voltage and adjusting a switching duty cycle to regulate the controlled bus voltage to a target value. The pulse-width modulator for a stage provides a substantially identical switching duty cycle to each switch of the stage. The switching duty cycle includes a signal to control a switch on and then off for a portion of a switching period.

20 Claims, 4 Drawing Sheets

APPARATUS, SYSTEM, AND METHOD FOR A LOW COST SELF-HEALING POWER SUPPLY

BACKGROUND OF THE INVENTION

1. Field of the Invention

This invention relates to power supplies and more particularly relates to low-cost self-healing power supplies.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating circuitry to tightly control the output voltage and/or current of the power supply to a specific value. The specific value is closely maintained despite variations in the load presented to the power supply's output, or any reasonable voltage variation at the power supply's input.

For example, in an electronic device such as a computer, the power supply is typically designed to convert an AC voltage input such as is traditionally provided by a conventional wall socket, into several low-voltage DC power outputs for transmission to the internal components of the electronic device. Conversion is typically performed in stages that may include various different stages such as a rectification stage, a pre-regulation stage such as an active harmonic filter, a regulator/chopper stage, etc. The stages may be a boost stage, a buck stage, or other derivative topology.

Some stages in a power supply may include a pulse-width modulator that regulates a bus voltage by sensing a controlled bus voltage and adjusting a switching duty cycle to regulate the controlled bus signal to some target value. Conventional power supplies typically use a power Metal Oxide Semiconductor Field-Effect Transistor ("MOSFET") as the switching component because power MOSFETs can switch at very high speeds. However, power MOSFETs are also one of the most likely components to fail in a power supply. When a power MOSFET in a conventional power supply fails, the power supply is no longer able to continue providing power, and therefore, systems powered by the power supply remain inoperational until the faulty power supply is replaced. This can result in a significant loss of productivity.

Artisans have attempted to resolve failure problems in power supplies by implementing completely redundant power supplies with a power back plane. However, the costs of implementing fully redundant power supplies can be expensive and inefficient. Thus, a need exists for a low cost self-healing power supply that provides fault protection at a lower cost than implementing fully redundant power supplies.

SUMMARY OF THE INVENTION

From the foregoing discussion, it should be apparent that a need exists for an apparatus, system, and method for implementing a low cost self-healing power supply. Beneficially, such an apparatus, system, and method would provide inexpensive increased fault protection in a power supply by implementing redundant power MOSFETs within various stages of the power supply such that if one MOSFET fails, an additional MOSFET allows the power supply to continue operation.

The present invention has been developed in response to the present state of the art, and in particular, in response to the problems and needs in the art that have not yet been fully solved by currently available power supplies. Accordingly, the present invention has been developed to provide an apparatus, system, and method for implementing a low-cost self-healing power supply that overcome many or all of the above-discussed shortcomings in the art.

The apparatus includes a power supply that regulates a direct current ("DC") regulated bus to maintain a regulated bus voltage under varying load conditions. The power supply includes at least one pulse-width modulated stage, where each pulse-width modulated stage includes at least two switches connected in parallel. Each switch includes a fuse connected in series with the switch that disconnects the switch in response to an over current condition sufficient to open the fuse.

The power supply also includes a pulse-width modulator for each stage of the power supply that regulates a bus voltage controlled by the stage by sensing the controlled bus voltage and adjusting a switching duty cycle to regulate the controlled bus voltage to a target value. The pulse-width modulator for a stage provides a substantially identical switching duty cycle to each switch of the stage. The switching duty cycle includes a signal to control a switch on and then off for a portion of a switching period.

In one embodiment of the apparatus, the over current condition sufficient to open a fuse comprises a failure of the switch connected in series with the fuse that results in the switch failing in a low impedance ("shorted") state.

The apparatus further comprises, in one embodiment, a failure sensing module configured to detect a failed switch. In a further embodiment, the failure sensing module detects a failed switch by detecting a voltage across the switch at a low value when a high value is expected. In yet a further embodiment, the failure sensing module detects a failed switch by detecting a temperature increase on a die that includes the failed switch. In one embodiment, detecting a temperature increase includes detecting a fan speed increase, where the fan speed is increased in response to detecting a temperature increase on the die that includes the failed switch.

In a further embodiment, the apparatus may include a failure warning module configured to send an alert in response to the failure sensing module detecting a failed switch. Sending an alert may include turning on an indicator on the power supply and/or sending a message to a system in communication with the power supply.

In one embodiment, the power supply includes a primary stage and a regulator stage in series. The primary stage regulates a voltage on an internal bus that serves as input for the regulator stage. The regulator stage regulates the regulated bus voltage. In various embodiments, the primary stage includes an active harmonic filter that provides approximately unity power factor correction and harmonic filtering. In a further embodiment, the primary stage may include a boost converter that regulates the internal bus to a voltage greater than an input voltage provided to the boost-type stage and the regulator stage comprises a buck-type converter that regulates the regulated bus to a value lower than the internal bus.

A system and method of the present invention are also presented for implementing a low cost self-healing power supply. The system and method in the disclosed embodiments substantially includes the steps necessary to carry out the functions presented above with respect to the operation of the described apparatus and system. The system includes one or more power supplies that regulate a DC regulated bus to maintain a regulated bus voltage under varying load conditions. The system includes an electronic device comprising the varying load. In the system, the regulated bus is connected between the electronic device and the one or more power supplies, and the regulated bus delivers power from the one or more power supplies to the electronic device.

The one or more power supplies include at least one pulse-width modulated stage where each pulse-width modulated stage includes at least two switches connected in parallel. Each switch includes a fuse connected in series with the switch that disconnects the switch in response to an over current condition sufficient to open the fuse. The one or more power supplies include a pulse-width modulator for each stage of the power supply that regulates the bus voltage controlled by the stage by sensing the controlled bus voltage and adjusting a switching duty cycle to regulate the controlled bus voltage to a target value. The pulse-width modulator for a stage provides a substantially identical switching duty cycle to each switch of the stage. The switching duty cycle includes a signal to control a switch on and then off for a portion of a switching period.

In one embodiment, the system includes a communication bus that communicates an alert sent by the failure warning module to a system in communication with the power supply. In a further embodiment, the electronic device may include a personal computer, a laptop computer, or a server.

The method includes sensing a controlled bus voltage of a stage within a power supply, and adjusting a switching duty cycle by a pulse-width modulator of the stage to regulate the controlled bus voltage of the stage to a target value. The pulse-width modulator for the stage provides a substantially identical switching duty cycle to each switch of the stage, the switching duty cycle comprising a signal to control a switch on and then off for a portion of a switching period. The power supply includes at least one pulse-width modulated stage, where each pulse-width modulated stage includes at least two switches connected in parallel. Each switch comprising a fuse connected in series with the switch that disconnects the switch in response to an over current condition sufficient to open the fuse. The power supply includes a pulse-width modulator for each stage of the power supply that regulates the sensed controlled bus voltage that is controlled by the stage. One of the one or more controlled buses includes a DC regulated bus regulated under varying load conditions of a load connected to the regulated bus In further embodiments, the method includes sensing a failed switch within the power supply, and sending an alert in response to the failure sensing module detecting a failed switch. In yet a further embodiment, sensing a failed switch further includes one of detecting a voltage across the switch at a low value when a high value is expected and detecting a temperature increase on a die that includes the failed switch.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
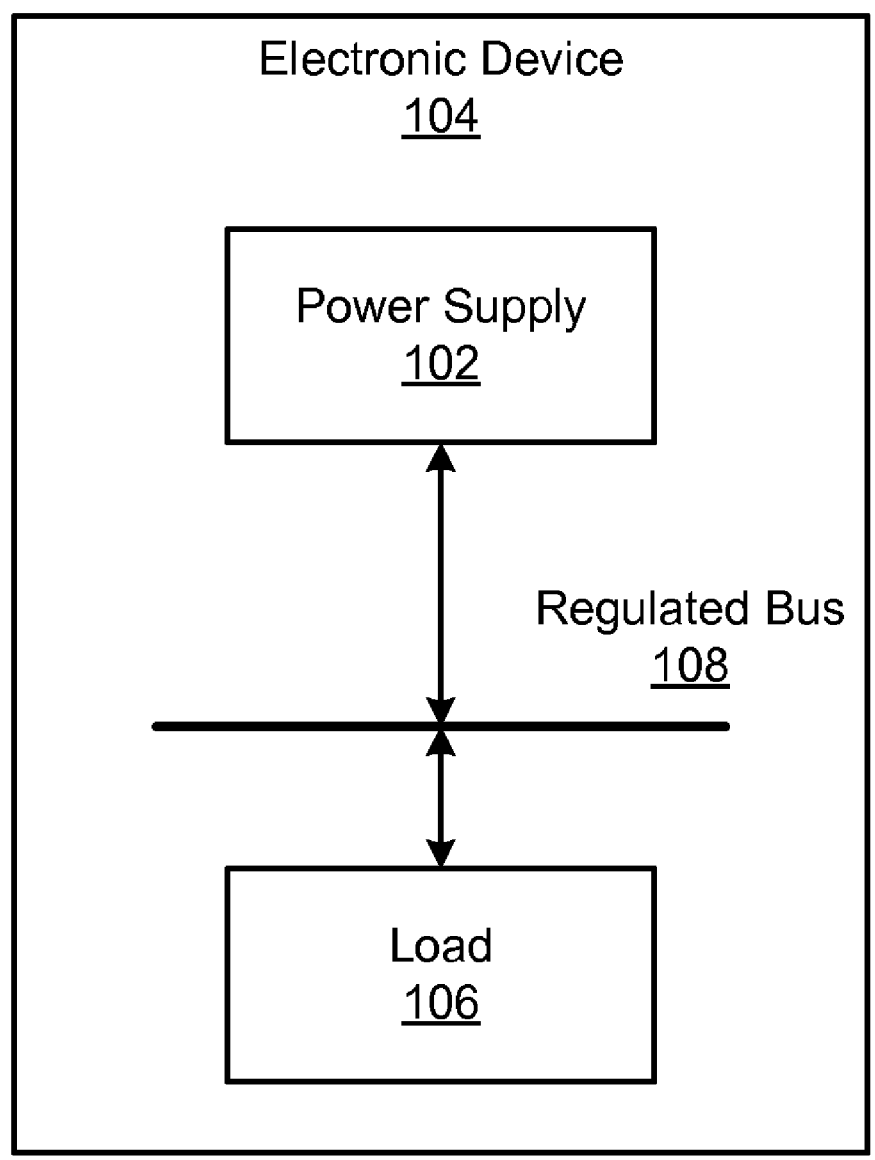
FIG. 1 is a schematic block diagram illustrating one embodiment of a system with a low cost self-healing power supply in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 with a low cost self-healing power supply 102 in accordance with the present invention. The system 100 includes an electronic device 104, a power supply 102, a regulated bus 108, and a load 106.

The power supply 102 provides regulated power to the electronic device 104 to power various electronic systems and subsystems within the electronic device 104. The power supply is typically connected to the electronic device 104 by a regulated bus 108. The regulated bus 108 and power supply 102 may be configured to provide one or more different voltages and currents to the electronic device 104. For example, in a typical power supply, voltages of +12v, +5v, +3.3v, and −12 v are commonly provided.

In various embodiments, the electronic device 104 may be a computer system, such as a desktop, laptop, or server, and the power supply 102 may be configured to provide power to the various components of the computer system. In other embodiments, the electronic device 104 may include devices such as routers, personal digital assistants (PDAs), displays, or other electronic devices as recognized by one of skill in the art. In one embodiment, the power supply 102 may be implemented within the same enclosure as the electronic device 104, such as within a computer tower case. In other embodiments, the power supply 102 may be implemented external to the electronic device 104 and may be connected to the electronic device 104 via a connection means such as a cord, cable, or bus such as in a blade center.

The electronic device 104 causes a load 106 to be applied to the power supply 102. The amount of load 106 may affect the performance of the power supply 102. The power supply 102 is preferably configured to operate efficiently in conjunction with a specified load 106. In one embodiment, the load 106 may vary depending on the operation characteristics of the electronic device 104 and the power supply 102 may be configured to adjust accordingly. For example, the power supply 102 may include a feedback signal for adjusting the power output characteristics of the power supply 102 in response to changes in the load 106. Typically, the power supply 102 regulates the voltage on the regulated bus 108 so as to provide substantially constant voltage levels to the electronic device 104 under varying load conditions.

Figure 2:
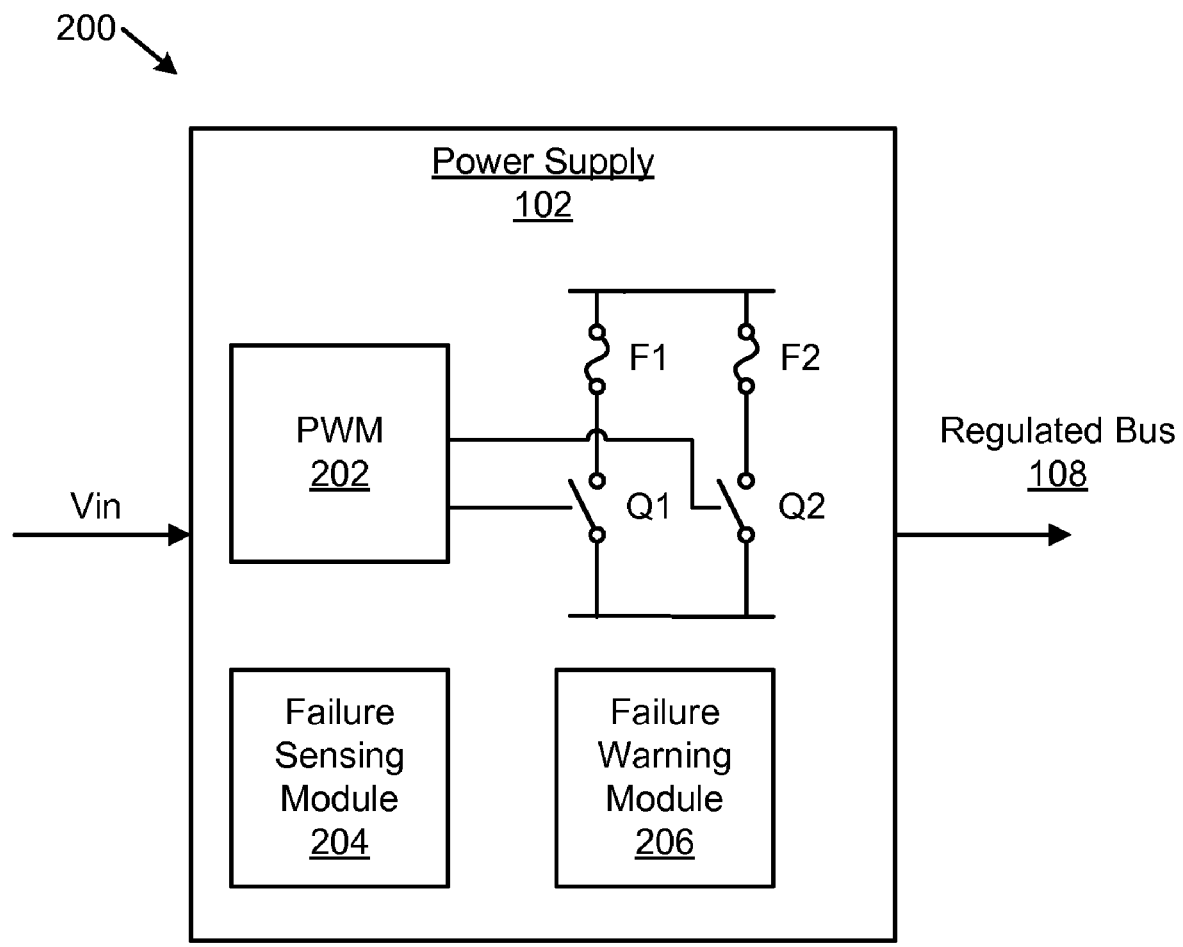
FIG. 2 is a schematic block diagram illustrating another embodiment of a system with a low cost self-healing power supply in accordance with the present invention.

FIG. 2 is a schematic block diagram illustrating one embodiment of a system 200 with a low cost self-healing power supply 102 in accordance with the present invention. In one embodiment, the power supply 102 receives an input voltage Vin as an input. The input voltage Vin is preferably an alternating current ("AC") voltage such as that provided by a common 120 volt or 240 volt wall outlet. In various embodiments, the input voltage Vin may be provided to the power supply 102 by different supply means such as through a power cord or a rack system. In some embodiments, the input voltage Vin is a direct current ("DC") voltage. In one embodiment, the DC voltage may be provided by an external power converter that converts AC power into DC power.

The power supply 102 regulates a DC regulated bus 108 to maintain a regulated bus voltage under varying load 106 conditions. The power supply 102 includes at least one pulse-width modulated stage, wherein each pulse-width modulated stage includes at least two switches Q1, Q2 connected in parallel. Preferably, each switch Q1, Q2 includes a fuse F1, F2 connected in series with the switch Q1, Q2 respectively such that the corresponding switch Q1, Q2 is disconnected by the fuse F1, F2 in response to an over current condition sufficient to open the fuse F1, F2. The switches Q1, Q2 are implemented in parallel to provide redundancy protection in the event of a failure of one of the switches Q1, Q2. Initially, in one embodiment, both switches Q1, Q2 are operating simultaneously to regulate the voltage on a bus. In the event one of the switches Q1, Q2 fails, the corresponding fuse Ft, F2 will disconnect the failed switch Q1, Q2 from the circuit, and the switch Q1, Q2 that did not fail continues to operate normally.

The switches Q1, Q2 are preferably implemented as power Metal Oxide Semiconductor Field-Effect Transistors ("MOSFETs"). A power MOSFET is a specific type of transistor typically designed to handle large amounts of current. Power MOSFETs are preferred because they have a high commutation speed and high efficiency at low voltages. Of course, as will be recognized by one of skill in the art, other types of switches Q1, Q2, may also be used including other types of MOSFETS, transistors, or other electronic switches. Power MOSFETs are typically the most common component in a power supply 102 to fail. Therefore, by providing redundancy in the MOSFET switches Q1, Q2, the reliability and life expectancy of the power supply 102 is dramatically increased for at a very low cost.

The power supply 102 also includes a pulse-width modulator 202 for each stage of the power supply 102. The pulse-width modulator regulates a bus voltage output by the corresponding stage by sensing the bus voltage and adjusting a switching duty cycle to regulate the bus voltage to a target value. For example, in regard to the output stage of the power supply 102 that regulates voltage on the regulated bus 108, the voltage on the regulated bus 108 may be monitored and fed back to the power supply 102 to compare the voltage output on the regulated bus 108 with a reference voltage that represents the target value. The power supply 102 adjusts the output voltage if needed in order to match the target reference voltage. A similar process may occur for each stage in the power supply 102 in order to maintain substantially constant voltages on each of the internal buses as well as on the regulated output bus 108.

Typically, in a switching power supply, switches are turned on at a fixed switching rate. For example, if a switching rate is 100 kilo-Hertz ("kHz"), the switching period is 10 micro seconds. Duty cycle is typically a ratio of an amount of time a switch is commanded on during a switching period divided by the switching period. So if a switch is commanded on for 5 microseconds of a 10 microsecond switching period, the duty cycle is 5 microseconds divided by 10 microseconds or 0.5. The minimum duty cycle is 0 and the maximum duty cycle is 1.0.

Preferably, the pulse-width modulator 202 for each stage provides a substantially identical switching duty cycle to each switch Q1, Q2 of the various stages. This is typically accomplished by sending a signal from the pulse width modulator 202 to each switch Q1, Q2 to turn each switch on and then off for a portion of a switching period. In one embodiment, a single pulse width-modulator 202 may be utilized to provide signals to each of the switches Q1, Q2 thereby maintaining a substantially identical switching duty cycle.

In one embodiment of the power supply 102, a failure sensing module 204 may be provided to detect a failed switch Q1, Q2. The failure sensing module 204 may detect a failed switch Q1, Q2 by detecting a voltage across the switch Q1, Q2 at a low value when a high value is expected. For example, if a switch Q1, Q2 is commanded off but the switch Q1, Q2 has failed short, the voltage across the switch Q1, Q2 will approach zero volts when it is expected to be a much higher voltage. In another embodiment, voltage at the output of a stage is detected and the failure sensing module 204 determines that a switch Q1, Q2 has failed if the output voltage of the stage dips below a specified value. In a further embodiment, the failure sensing module 204 may detect a failed switch Q1, Q2 by detecting a temperature increase on a die that includes the failed switch Q1, Q2. In yet a further embodiment, the failure sensing module 204 may also detect a fan speed increase thereby indicating a temperature increase on the die that includes the failed switch Q1, Q2.

Typically when a switch (e.g. Q1) fails, the other switch Q2 in parallel will then draw more current because the current is no longer shared between the switches Q1, Q2. This increase in current will generate more heat than two switches operating in parallel. This is because the parasitic resistance of the switch (drain-to-source resistance of a MOSFET) of two switches Q1, Q2 operating connected in parallel is about half of the parasitic resistance of one switch Q2 that continues to be connected after the fuse F1 of the failed switch Q1 opens. The failure sensing module 204 may detect the temperature rise or may detect a fan speed increase where the fan increases in speed based on a temperature increase.

If the failure detection module detects a failed switch Q1, Q2, a failure warning module 206 may send an alert in response to the detection of the failed switch Q1, Q2. In one embodiment, the alert may include turning on an indicator on the power supply 102, such as a light emitting diode (LED), or in another embodiment, the alert may include sending a message to a system in communication with the power supply 102. In the event one of the switches (e.g. Q1) fails, and an alert is generated, a user may choose to immediately replace the power supply 102 before a failure of the second switch Q2 which may cause the power supply 102 to stop operating completely. Or alternatively, a user may continue to operate the power supply 120 as is (with a failed switch) until an additional failure is detected.

In one embodiment, the failure warning module 206 may shut down and reboot the power supply in response to the failure of one of the switches (e.g. Q1). Upon reboot, the power supply 102 will continue operating normally by utilizing a provided redundant switch (e.g. Q2). In this manner, the power supply 102 is able to self heal in the event of a failure of a switch Q1, Q2.

Figure 3:
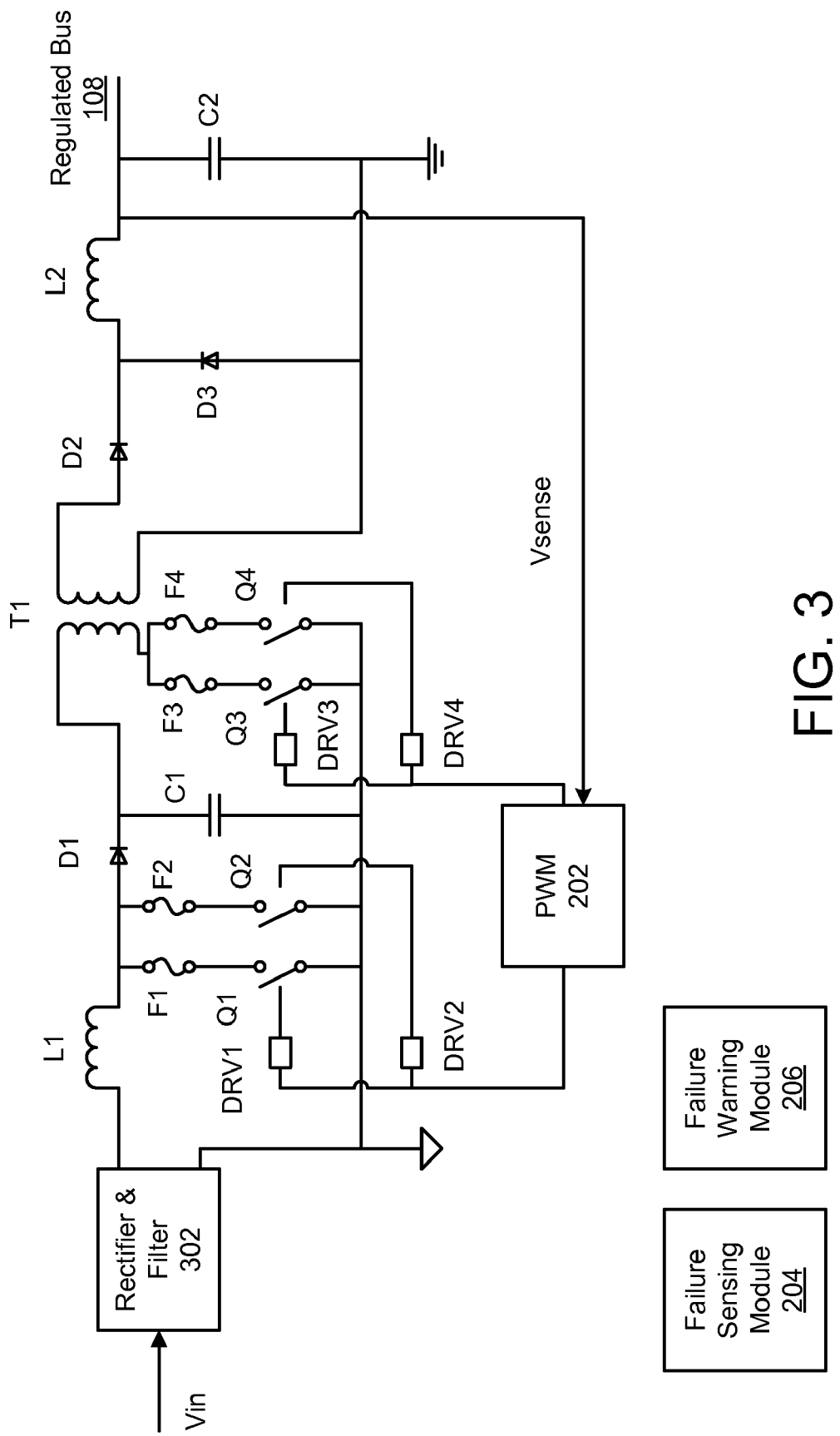
FIG. 3 is a schematic block diagram illustrating one embodiment of a low cost self-healing power supply in accordance with the present invention.

FIG. 3 is a schematic block diagram illustrating one detailed embodiment of a low cost self-healing power supply 102 in accordance with the present invention. The power supply 102 is a two stage power supply 102 with two switches Q1, Q2 in the first stage and two switches Q3, Q4 in the second stage. In various embodiments, the first stage is a primary stage, such as a boost stage or a buck stage, and the second stage is a regulator stage that regulates the regulated bus 108 and provides power to the electrical device 104. Each switch Q1, Q2, Q3, Q4 has a corresponding fuse F1, F2, F3, F4 for disconnecting the switch Q1, Q2, Q3, Q4 in the event of a failure of one of the switches Q1, Q2, Q3, Q4.

In one embodiment, the power supply 102 receives as an input an AC input voltage Vin that is fed to an input rectifier and filter 302. The input rectifier and filter 302 rectifies the AC voltage Vin in order to produce a DC voltage at the output of the input rectifier and filter 302. The input rectifier and filter 302 may also include an electro-magnetic compatibility ("EMC") filter in order to meet industry standards for electro-magnetic compatibility as will be recognized by one of ordinary skill in the art.

The output of the rectifier and filter 302 is connected in series to an inductor L1. As the switches Q1, Q2 are switched on and off, the inductor L1 provides a current that allows a boost voltage to be realized at the output of the first capacitor C1. When the switches Q1, Q2 are on, the current through the first inductor L1 starts to increase. Then when the switches Q1, Q2 are turned off, the inductor L1 continues to provide current for a limited amount of time to the capacitor C1 through the diode D1 such that the voltage on the output of the stage is capable of being greater than the voltage at the input of the stage (the output of the rectifier and filter 302). Such an implementation (including the first inductor L1, the connected switches Q1, Q2 and associated fuses F1, F2, the first diode D1, and the first capacitor C1) is called a boost stage because the voltage is 'boosted' above the input voltage as will be recognized by one of skill in the art. Of course, other types of topology may be implemented such as boost-like topologies or buck-like topologies as will be recognized by one of skill in the art.

The switches Q1, Q2 are turned on or off by a signal from a pulse-width modulator 202. In one embodiment, drivers DRV1, DRV2 may be provided to convert the signal from the pulse-width modulator into a signal that is compatible with the switches Q1, Q2. The switches Q1, Q2 are controlled by the pulse-width modulator 202 by utilizing a particular switching duty cycle to obtain a substantially constant voltage on the output of the first stage at the first capacitor C1. The voltage may be regulated to a higher or lower voltage by changing the switching period of the switching duty cycle. A feedback signal (not shown) from the output of the second stage (capacitor C1) is used by the pulse-width modulator 202. If the first stage is part of an active power factor correction circuit, other voltage and current signals (not shown) are also fed into the pulse-width modulator 202 to control the switches Q1, Q2. The pulse-width modulator 202 then generates a duty cycle based on the feedback signals and a control formula implemented in the pulse-width modulator 202. The pulse width-modulator 202 preferably provides substantially identical control signals to the switches Q1, Q2 such that they turn on or turn off at the same time thereby operating redundantly.

In the event of a failure of one of the switches Q1, Q2 caused by an over current condition, the corresponding fuse F1, F2 which are provided in series with the switches Q1, Q2, will disconnect the failed switch Q1, Q2 from the circuit. Then, the power supply 102 may continue operating normally utilizing only a single switch Q1 instead of two redundant switches Q1, Q2.

In one embodiment, the over current condition may be caused by a low impedance ("shorted") state in one of the switches (e.g. Q1). This is a likely condition because MOSFETs often fail in a shorted condition. In this case, a sudden drop in voltage might be observed between failure (short circuit) and the disconnection of the fuse (e.g. F1). After the fuse F1 opens, the power supply 102 is able to continue operating with only a single connected switch Q2. This provides increased failure protection in the power supply 102 at the very low cost of adding an additional switch (e.g. Q2, Q4) to each stage of the power supply 102. Thus, redundancy protection is provided without the cost of an entirely separate additional power supply.

The first stage, or primary stage, in one embodiment, may be implemented as an active harmonic filter that provides approximately unity power factor correction and harmonic filtering. In various embodiments, the first stage may be implemented as a boost stage (depicted), as a buck stage, or as some other power supply 102 stage including variations of buck-type topologies and boost-type topologies as will be recognized by one of skill in the art. A boost stage is a stage that regulates an output voltage to a voltage greater than an input voltage, and a buck stage is a stage that regulates an output voltage to a voltage less than an input voltage.

In the depicted embodiment, as the first stage operates, the regulated voltage on the output of the first stage is provided to a transformer T1 which acts as an input to the second stage. The second stage includes two switches Q3, Q4 and associated fuses F3, F4, the transformer T1, diodes D2, D3 on the transformer T1 secondary, the second inductor L2, and second capacitor C2. The second stage, or the regulator stage, operates similar to the primary stage described above and regulates the voltage at the output of the power supply 102 (on the regulated bus 108). The pulse-width modulator 202 provides a signal to the switches Q3, Q4 to cause a regulated voltage to be maintained at the output of the stage. Like the first stage, fuses F3, F4 are provided in series with the switches Q3, Q4 such that the fuses F3, F4 disconnect the corresponding switch Q3, Q4 from the circuit in the event of a failure of one of the switches Q3, Q4.

When the second stage switches Q3, Q4 are closed, the voltage across the first capacitor C1 is applied across the transformer T1, which causes a current to flow through the series diode D2 and to increase through the second inductor L2 to charge up the second capacitor C2 if voltage across the second capacitor C2 is less than voltage at the output of the transformer T1. When the switches Q3, Q4 of the second stage are opened, current through the second inductor L2 continues to flow and the parallel connected diode D3 is forward biased. The on and off times of the switches (duty cycle) are varied such that a voltage is maintained on the regulated bus 108.

The output voltage may be fed back to the pulse-width modulator 202 as a feedback signal Vsense in order to adjust and maintain proper voltages on the output of the regulator stage of the power supply 102. The feedback Vsense may be compared to a reference voltage, and the switching duty cycle may be adjusted accordingly in order to cause the output voltage of the second stage to increase or decrease. Typically, different switching duty cycles may be applied to different stages in the power supply 102 such that the output voltage of one stage differs from the output voltage of another stage.

In other embodiments, the transformer T1 may include multiple secondary windings. Diodes, inductors, and capacitors similar to those of the second stage (i.e. D3, D4, L2, C2) may be connected to the other secondary windings of the transformer T1 to provide additional voltages of the regulated bus 108. Typically one output bus of the second stage is controlled and the other secondary stages are proportional to the output voltage of the controlled stage. In other embodiments, each secondary stage is controlled with a separate pulse-width modulator 202.

As described above with regard to FIG. 2, a failure sensing module 204 may be provided to detect a failed switch Q1, Q2, Q3, Q4 within any of the stages of the power supply 102. If the failure sensing module 204 detects a failed switch Q1, Q2, Q3, Q4 the failure warning module 206 may send an alert in response to the detection of the failed switch Q1, Q2, Q3, Q4 to notify a user of the failure. In the event one of the switches Q1, Q2, Q3, Q4 fails, and an alert is generated, a user may choose to immediately replace the power supply 102 before a failure of a second switch Q1, Q2, Q3, Q4 which may cause the power supply 102 to stop operating completely. Or alternatively, a user may continue to operate the power supply 120 as is (with a failed switch) until an additional failure is detected.

Figure 4:
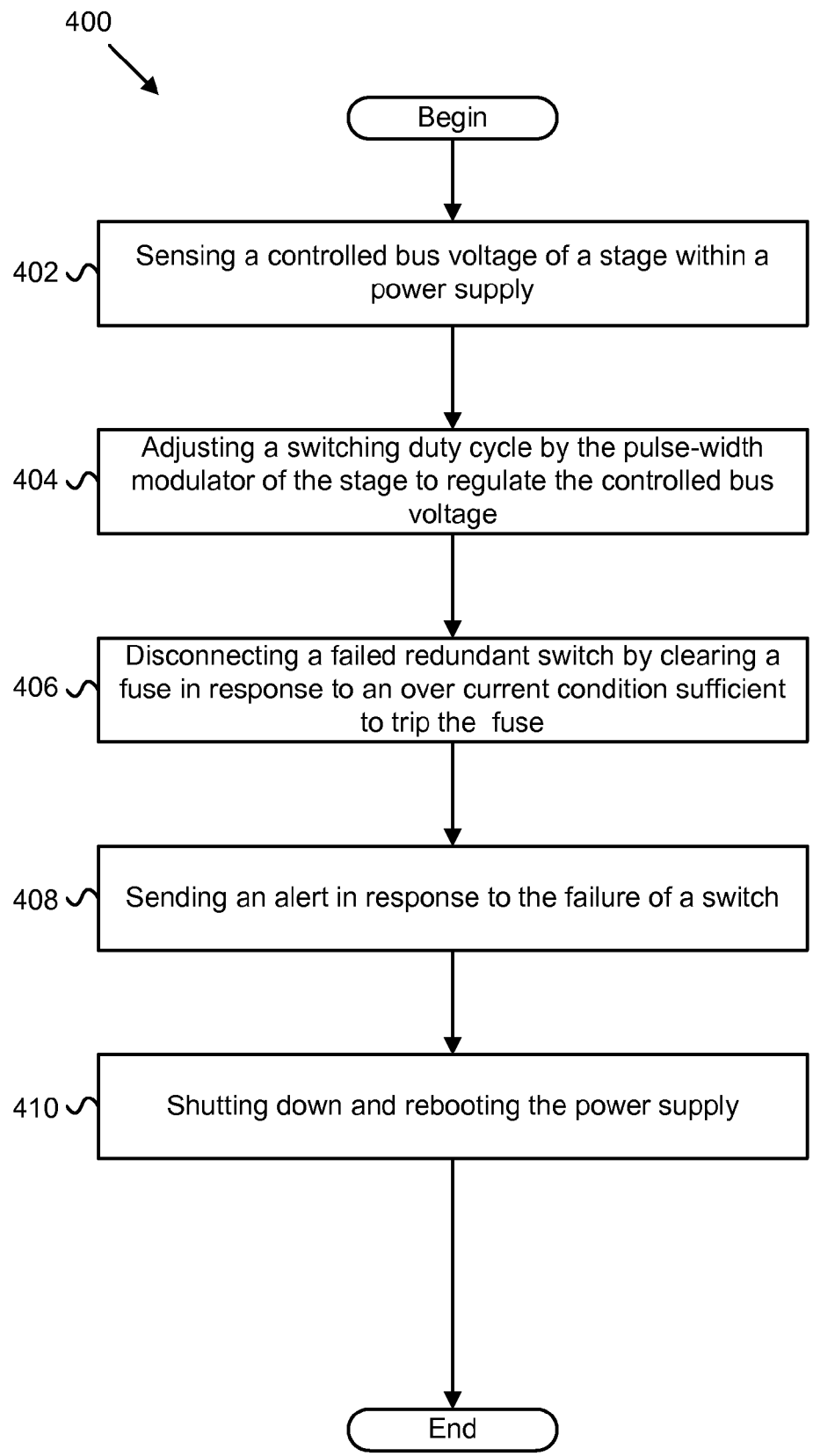
FIG. 4 is a schematic flow chart diagram illustrating one embodiment of a method for regulating voltage in a power supply in accordance with the present invention.

FIG. 4 is a schematic flow chart diagram illustrating one embodiment of a method 400 for regulating voltage in a power supply 102 in accordance with the present invention. The method 400 substantially includes the embodiments and modules described above with regard to FIGS. 1-3. The method 400 begins by sensing 402 a voltage on a regulated bus 108 to determine the current voltage on the regulated bus 108. A feedback signal Vsense (and other signals for multiple stages) is returned to at least one pulse-width modulator 202 that regulates the voltage on the output bus of the controlled stage of the power supply 102. In one embodiment, a pulse-width modulator 202 is provided for each stage of the power supply 102. In an alternate embodiment, a single pulse-width modulator 202 controls more than one stage of the power supply 102 at a time.

The power supply 102 includes at least one pulse-width modulated stage, and each modulated stage includes at least two switches Q1, Q2 or Q3, Q4 connected in parallel. Each switch Q1, Q2, Q3, Q4 includes a fuse F1, F2, F3, F4 connected in series with the switch Q1, Q2, Q3, Q4 that disconnects the corresponding switch Q1, Q2, Q3, Q4 in response to an over current condition sufficient to open the fuse F1, F2, F3, F4, such as a short-circuit condition.

The pulse-width modulator 202 adjusts 404 a switching duty cycle to regulate the controlled bus voltage to a target value. The pulse-width modulator 202 for each stage provides a substantially identical switching duty cycle to each switch Q1, Q2 within the stage. Thus, the switches operate simultaneously to regulate the voltage at the output of each stage. By increasing or decreasing a switching period for the pulse-width modulator 202, the voltage on the output of each stage may be adjusted up or down to correspond to a target voltage.

In one embodiment, a failed switch Q1, Q2, Q3, Q4 is disconnected 406 by the opening or tripping of a redundant fuse F1, F2, F3, F4 in response to an over current condition sufficient to open or trip the fuse F1, F2, F3, F4. In such an embodiment, the failure of a switch (e.g. F1) may cause too much current to pass through the switch's Q1 associated fuse F1, which in turn causes the fuse F1 to open or trip, thereby separating the failed switch Q1 from the circuit. By separating the failed switch Q1 from the circuit, the other components in the power supply 102 are protected, and the redundant components (e.g. Q2, Q4) may allow the power supply 102 to continue operating normally, even after a failure of one of the switches (e.g. Q1, Q3).

In another embodiment, a failure sensing module 204 detects a failure in one of the switches Q1, Q2, Q3, Q4. In one embodiment, sensing a failure is accomplished by detecting 406 a voltage across a switch Q1, Q2, Q3, Q4 at a low value when a high value is expected. In another embodiment, a failure may be detected by detecting a temperature increase on a die that includes the failed switch Q1, Q2, Q3, Q4. In yet a further embodiment, a failure may be detected 406 by monitoring a fan speed and determining that an abnormally high fan speed indicates a failed switch Q1, Q2, Q3, Q4. A failed switch Q1, Q2, Q3, Q4 may then be disconnected 406 in response to the detection of a failure.

A failure warning module 206 sends 408 an alert in response to a failure of one of the switches Q1, Q2, Q3, Q4. An alert sent 408 by the failure warning module 206 may include notifications such as lighting an LED, sounding an alarm, or sending a signal to a system to display a warning message. Of course, other alerting means may be utilized as will be recognized by one of skill in the art.

In some embodiments, the power supply 102 is shut down 410 and rebooted 410 in response to a failure of one of the switches Q1, Q2, Q3, Q4. After the power supply is rebooted 410, the redundant components of the power supply 102 (e.g. Q2, Q4) may be utilized to continue operation of the power supply 102 until a replacement power supply 102 is provided, or until an additional switch Q1, Q2, Q3, Q4 fails. In this manner, the power supply is able to self heal in the event of a failure of one of the switches Q1, Q2, Q3, Q4.

The method 400 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A apparatus to regulate voltage, the apparatus comprising:
a power supply that regulates a direct current ("DC") regulated bus to maintain a regulated bus voltage under varying load conditions, the power supply comprising
at least one pulse-width modulated stage, each pulse-width modulated stage comprising at least two switches connected in parallel, each switch comprising a fuse connected in series with the switch that disconnects the switch in response to an over current condition sufficient to open the fuse; and
a pulse-width modulator for each stage of the power supply that regulates a bus voltage controlled by the stage by sensing the controlled bus voltage and adjusting a switching duty cycle to regulate the controlled bus voltage to a target value, wherein the pulse-width modulator for a stage provides a substantially identical switching duty cycle to each switch of the stage, the switching duty cycle comprising a signal to control a switch on and then off for a portion of a switching period.

2. The apparatus of claim 1, wherein the over current condition sufficient to open a fuse comprises a failure of the switch connected in series with the fuse that results in the switch failing in a low impedance ("shorted") state.

3. The apparatus of claim 1, further comprising a failure sensing module configured to detect a failed switch.

4. The apparatus of claim 3, wherein the failure sensing module detects a failed switch by detecting a voltage across the switch at a low value when a high value is expected.

5. The apparatus of claim 3, wherein the failure sensing module detects a failed switch by detecting a temperature increase on a die that includes the failed switch.

6. The apparatus of claim 5, wherein detecting a temperature increase further comprises detecting a fan speed increase, wherein the fan speed is increased in response to detecting a temperature increase on the die that includes the failed switch.

7. The apparatus of claim 3, further comprising a failure warning module configured to send an alert in response to the failure sensing module detecting a failed switch.

8. The apparatus of claim 7, wherein sending an alert comprises one or more of turning on an indicator on the power supply and sending a message to a system in communication with the power supply.

9. The apparatus of claim 1, wherein power supply comprises a primary stage and a regulator stage in series, the primary stage regulating a voltage on an internal bus that serves as input for the regulator stage, the regulator stage regulating the regulated bus voltage.

10. The apparatus of claim 9, wherein the primary stage comprises an active harmonic filter that provides approximately unity power factor correction and harmonic filtering.

11. The apparatus of claim 9, wherein the primary stage comprises a boost converter that regulates the internal bus to a voltage greater than an input voltage provided to the boost-type stage and the regulator stage comprises a buck-type converter that regulates the regulated bus to a value lower than the internal bus.

12. A system to regulate voltage, the system comprising:
one or more power supplies that regulate a direct current ("DC") regulated bus to maintain a regulated bus voltage under varying load conditions, at least one power supply comprising
at least one pulse-width modulated stage, each pulse-width modulated stage comprising at least two switches connected in parallel, each switch comprising a fuse connected in series with the switch that disconnects the switch in response to an over current condition sufficient to open the fuse; and
a pulse-width modulator for each stage of the power supply that regulates the bus voltage controlled by the stage by sensing the controlled bus voltage and adjusting a switching duty cycle to regulate the controlled bus voltage to a target value, wherein the pulse-width modulator for a stage provides a substantially identical switching duty cycle to each switch of the stage, the switching duty cycle comprising a signal to control a switch on and then off for a portion of a switching period;

an electronic device comprising the varying load; and the regulated bus being connected between the electronic device and the one or more power supplies, wherein the regulated bus delivers power from the one or more power supplies to the electronic device.

13. The system of claim 12, wherein each of the at least one power supplies further comprises a failure sensing module configured to detect a failed switch.

14. The system of claim 13, wherein each of the at least one power supplies further comprises a failure warning module configured to send an alert in response to the failure sensing module detecting a failed switch.

15. The system of claim 14, further comprising a communication bus that communicates an alert sent by the failure warning module to a system in communication with the power supply.

16. The system of claim 12, wherein the electronic device comprises one of a personal computer, a laptop computer, and a server.

17. A computer program product comprising a computer readable medium having computer usable program code executable to perform operations for regulating voltage in a power supply, the operations of the computer program product comprising:

sensing a controlled bus voltage of a stage within a power supply, the power supply comprising at least one pulse-width modulated stage, each pulse-width modulated stage comprising at least two switches connected in parallel, each switch comprising a fuse connected in series with the switch that disconnects the switch in response to an over current condition sufficient to open the fuse; and a pulse-width modulator for each stage of the power supply that regulates the sensed controlled bus voltage that is controlled by the stage;

wherein one of the one or more controlled buses comprises a direct current ("DC") regulated bus regulated under varying load conditions of a load connected to the regulated bus; and adjusting a switching duty cycle by the pulse-width modulator of the stage to regulate the controlled bus voltage of the stage to a target value, wherein the pulse-width modulator for the stage provides a substantially identical switching duty cycle to each switch of the stages, the switching duty cycle comprising a signal to control a switch on and then off for a portion of a switching period.

18. The computer program product of claim 17, further comprising sensing a failed switch within the power supply.

19. The computer program product of claim 18, further comprising sending an alert in response to the failure sensing module detecting a failed switch.

20. The computer program product of claim 18, wherein sensing a failed switch further comprises one of detecting a voltage across the switch at a low value when a high value is expected and detecting a temperature increase on a die that includes the failed switch.

* * * * *